May 4, 1943. A. G. BOUHUYS 2,318,457
ELONGATED STRUCTURE FORMED FROM SYNTHETIC MATERIALS
Filed April 11, 1941
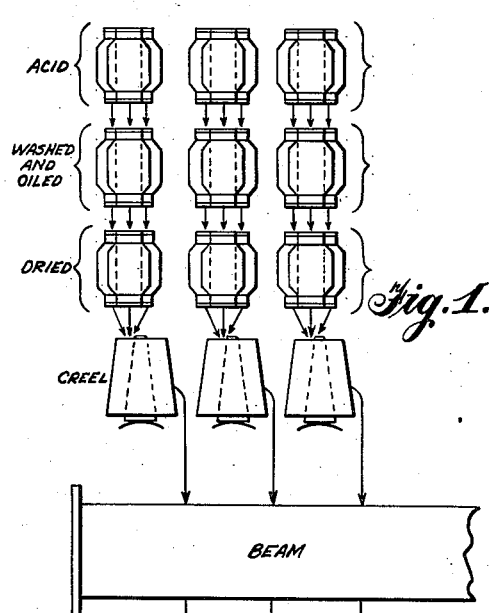
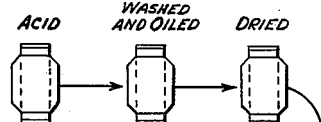
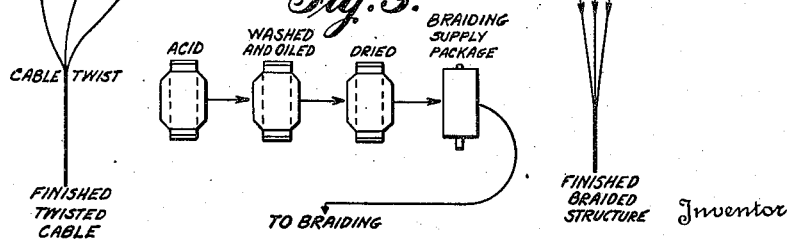
Inventor
Aleidus G. Bouhuys
By Albin F. Knight
Attorney Patented May 4, 1943

2,318,457

UNITED STATES PATENT OFFICE 2,318,457

ELONGATED STRUCTURE FORMED FROM SYNTHETIC MATERIALS

Aleidus G. Bouhuys, Enka, N. C., assignor to American Enka Corporation, Enka, N. C., a corporation of Delaware Application April 11, 1941, Serial No. 388,180

3 Claims. (Cl. 87—1)

This invention relates to a method of producing an elongated unitary structure composed of a multiplicity of continuous threads, yarns or filaments of synthetic origin and to the structure so produced.

More particularly, this invention is concerned with the association of a plurality of threads to produce a composite structure of increased denier characterized by increase in tensile strength substantially directly proportional to increase in denier, the structure being of wide general utility and particularly adapted for the reinforcement of rubber articles such as tires.

A long development has led to the now ever increasing substitution of cords of synthetic origin for those of natural origin in the preparation of tire carcasses and in other rubber reinforcing uses. First of all, it was necessary to improve the quality of the synthetic material. Of course, rayon has always had the favorable quality of being more heat resistant than any natural cellulose product, but substantial progress had to be made with respect to improvement in tensile strength, durability and resistance to breakage as a result of flexing, as well as control over extensibility or elongation. By improving the stretching operations during the extrusion and primary treating steps, rayon has now acquired a tremendous increase in strength both in wet and dry tenacity and the elongation differential has been materially decreased. The yarn itself, therefore, is now suitable in quality for use in rubber tires. As extruded, however, the resultant threads, even if of heavy denier, are too low in tensile strength to be used individually in the manufacture of tire carcasses. As a consequence, it is necessary to associate a plurality of threads into a unitary structure, the composite strength being sufficient to resist the strains to which the reinforcing material is subjected.

At first, it was thought that it would be possible to follow the teachings of the cotton thread art with respect to the association of a series of threads by imparting the usual thread twist, ply twist and cord twist. It was discovered, however, that the twisting together of yarns of synthetic origin, although resulting in the production of a unitary structure of a size that could be readily handled in the tire industry, resulted in changes of the characteristics of the material. It was thus determined that the properties of the cable produced by twisting are dependent in part upon the degree of twist at each stage in the formation thereof. Preferably, the yarn should be subjected to a very low degree of twist, but even this is not entirely satisfactory for it has been definitely determined that any twist imparted either to the filaments constituting the thread or the threads or plies constituting the cord lowers the effective strength of the cord. In other words, if the strength of a finally constructed cord is measured, it will be found to be less than the combined strengths of the individual filaments measured prior to twisting. As a matter of fact, even if the twisted cord is subsequently completely untwisted and the strength of the elementary filaments is remeasured, it is found that the filaments per se have lost some of their original tensile strength presumably due to the twisting operations.

The fact that twist influences the strength of rayon cords is evidenced by the Parker Patent No. 2,132,492. That patent is directed primarily to a twist that is low when compared to the twist disclosed by the prior art. Various ranges of twists are given for the thread, strand (intermediate) and cable (final), but the maximum at any stage does not comprehend substantially more than ten turns per inch. The patent discloses graphs plotting the strength of the cord against the turns per inch. It is obvious therefrom that an appreciable decrease in strength of the cord occurs as the turns per inch increase. The said decrease accelerates rapidly after the turns are over five per inch. Theoretically, in the range of from one to five turns per inch the strength decreases slightly as shown in the graph (Fig. 1). However, the patentee states that it has been determined that a slight twist may not appreciably impair the strength of the final cord or cable.

The fact that rayon threads, when twisted and plied to form a cord, lose some of their tensile strength has necessarily resulted in the employment of cords of sufficiently high denier to give the tensile strength required in the particular use. This inherently involves a waste of yarn directly proportional to the loss of tensile strength caused by the twisting.

It is, therefore, an object of this invention to overcome the difficulties heretofore encountered in the association of a multiplicity of continuous threads or yarns of synthetic origin and to produce a composite elongated unitary structure having a total strength equal to the sum of the strength of the component parts measured individually.

According to this invention, the production of rubber reinforcing strandular elements of low total denier but high strength per denier is contemplated.

It is a further object of this invention to provide a method for the immediate interassociation of a number of freshly spun untwisted threads of synthetic origin in such a way as to avoid twisting and the loss of tensile strength incident thereto. By this invention a superior reinforcing element for rubber articles is provided by a process of manufacturing vastly more simple and economical than heretofore known.

Another object is the utilization of threads, freshly spun and collected in package form and, after processing and drying in the initial package, directly interassociating the threads to form a structure adaptable as a reinforcing element.

Other objects and advantages of this invention will be apparent upon consideration of the detailed description thereof in conjunction with the annexed drawing wherein:

Figure 1 is a schematic illustration of the prior process steps generally involved in the manufacture of tire cords by twisting;

Figure 2 is a comparative schematic illustration of one form of the process of the present invention; and Figure 3 is a schematic illustration of a modified form of the present invention involving one additional step.

Referring more particularly to the drawing in which viscose yarn, spun according to bobbin spinning methods, is used for illustrative purposes, it will be seen that according to prior art methods freshly spun yarn was collected in bobbin form, was then washed, oiled and dried while wound on the package. A number of such packages were wound onto a cone to provide an ample source of supply in order to avoid interruptions incident to replacement during subsequent beaming operations. A multiplicity of cones were then collected individually on a beam and the beam transported to a twisting machine where the threads were single end twisted in package form as indicated in Figure 1. This first twist is known in the art as the thread twist. Twisted threads from several packages (depending on the denier of the individual threads), three for example, were finally twisted on a separate twisting machine preferably in the opposite direction from the thread twist, to form a cable for use as a reinforcing element in rubber tires and the like.

From the foregoing outline, it will be seen that aside from losses in tensile strength resulting from twisting, the process of producing tire cords was, as previously practiced, extremely inefficient involving the winding and unwinding of the thread a number of times with incident loss in operation economy.

Upon reference to Figure 2, which is also for purposes of illustration concerned with bobbin spun rayon, it will be seen that the initial steps are the same until the freshly spun thread is dried in package form. Thereafter, a suitable number of packages, preferably three depending on the denier as illustrated, are placed in feeding position on a suitable braiding machine. The untwisted threads led from each package are then braided together to form a composite elongated structure which is then in form for immediate use as a reinforcing element in rubber.

Because of the construction of braiding machines now in use, it is often necessary to modify the process of Figure 2 to include winding the untwisted yarn off of the spinning bobbin onto a braiding supply package. This is illustrated in Figure 3 and except for the collection of the thread onto the braiding supply package the process is identical.

The following example will serve to emphasize the tremendous advantages attained by the use of braiding in substitution for twisting in the manufacture of reinforcing elements:

*Example*

Three large untwisted threads of about four hundred and eighty filaments each and having a denier of about eleven hundred are extruded, stretched, washed and oiled and thereafter dried in original package form. The thread so produced when measured has a dry tenacity substantially above two grams per denier. The thread from the three packages is then braided together to produce a composite elongated structure of slightly above thirty-three hundred denier. This structure when measured is found to have a higher total tensile strength than has heretofore been obtained by twisting methods.

On the other hand, a cord of conventional construction having a strength desirable for reinforcing tires has normally a denier of at least four thousand, the usual 275—5—3 construction being about four thousand one hundred twenty-five denier, the tensile strength of the cord when measured is found to be ten to thirty percent less than the sum of the strengths of the individual filaments when measured before twisting. Thus, by following the methods of the present invention it is possible to produce a reinforcing element of nearly one thousand denier less than that heretofore known, but with approximately the same tensile strength.

While the foregoing description, as well as the illustration, is concerned with the braiding together of bobbin spun threads entirely untwisted and for example composed of regenerated cellulose, such as viscose, it will be recognized that the method may be applied to the manufacture of any type of synthetic yarn by pot spinning methods, the thread in the resultant cake being slightly twisted so as to not substantially reduce its tensile strength. The thread constituting the cake may be wound onto a braiding supply package or again the direct braiding operation from the initially formed package may be employed. For the purposes of this invention when applied to pot spinning, the term "untwisted" is intended to signify an unsubstantial twist of less than three turns per inch.

The method of the present invention contemplates also the braiding together of yarn spun in a continuous manner, in that event it being necessary only to lead the threads issuing from the last thread-storage, thread-advancing device directly to a supply package and thence into a braiding machine, the important feature of this invention being the interassociation of substantially untwisted yarns or threads and the production of a unitary structure also characterized by the absence of twist.

Although the braiding illustrated in the schematic drawings discloses the interassociation of three threads, it is evident that any number of threads may be so associated to form the composite structure. It has been found particularly desirable to braid together four untwisted threads so as to avoid objectionable flatness inherent in the braiding together of but three elements.

It can be readily seen that the present structure offers a number of advantages over the prior art, in that, lighter weight construction of superior strength may be used in the manufacture of composite articles such as rubber tires, belts, etc., wherein the strength of the reinforcing elements is of the utmost importance. Moreover, the untwisted filaments are not biased against each other and therefore excessive wear and strain is avoided.

It is to be understood that the invention is not to be restricted to any specific construction other than one in which synthetic threads composed of continuous filaments are interassociated without twisting and without a sheath.

What is claimed is:

1. A reinforced rubber article having imbedded therein, a reinforcing element consisting of several untwisted viscose threads braided together, the composite element being characterized by increase in denier without loss of tensile strength.

2. A rubber article having imbedded therein, a reinforcing element consisting of a plurality of threads composed of continuous untwisted filaments of viscose rayon interassociated to form a continuous unitary cord of substantially uniform cross-section throughout its length, the cord being characterized by the absence of twist in both the component threads and the resultant body.

3. A rubber article having imbedded therein, a reinforcing element consisting of several untwisted threads of viscose rayon braided together, the composite element being characterized by increase in denier without loss of tensile strength, said denier being of the order of thirty-three hundred.

ALEIDUS G. BOUHUYS.